Patented Oct. 12, 1954

2,691,686

UNITED STATES PATENT OFFICE 2,691,686

CONDENSATION OF AROMATIC COMPOUNDS WITH CYCLIC POLYOLEFINS

Herman S. Bloch, Chicago, Ill., assignor to Universal Oil Products Company, Chicago, Ill., a corporation of Delaware No Drawing. Application May 5, 1951, Serial No. 224,825

14 Claims. (Cl. 260—619)

This application is a continuation-in-part of my copending application Serial No. 732,145 filed March 3, 1947, now abandoned.

This invention relates to new compositions of matter consisting of condensation products of aromatic compounds with cyclic polyolefinic hydrocarbons having conjugated and non-conjugated unsaturation. It is also concerned with a process for catalytically condensing an aromatic compound containing at least one substitutable nuclear hydrogen atom with a cyclic polyolefinic hydrocarbon having conjugated and nonconjugated unsaturation.

It is an object of this invention to provide aromatic compounds in which at least one of the nuclear hydrogen atoms has been replaced by an unsaturated cyclic hydrocarbon group. Such compounds are useful as chemical intermediates in the synthesis of wetting agents, detergents, bactericides, insecticides, resins, and other organic compounds.

One embodiment of this invention relates to a process which comprises condensing an aromatic compound containing at least one substitutable nuclear hydrogen atom with a mixture of cyclic polyolefinic hydrocarbons having conjugated and non-conjugated unsaturation in the same molecule and recovered from a hydrocarbon complex of a conjunct polymerization catalyst, the condensation being carried out in the presence of a condensation catalyst which form substantially no stable complexes with said mixture of cyclic polyolefinic hydrocarbons.

Another embodiment of this invention relates to a condensation product of an aromatic compound containing at least one substitutable nuclear hydrogen atom with a mixture of cyclic polyolefinic hydrocarbons having conjugated and non-conjugated unsaturation in the same molecule and recovered from a hydrocarbon complex of a conjunct polymerization catalyst, the condensation reaction being carried out in the presence of a condensation catalyst which forms substantially no stable complexes with said mixture of cyclic polyolefinic hydrocarbons.

A further embodiment of this invention relates to a condensation process which comprises reacting an aromatic hydrocarbon containing at least one substitutable nuclear hydrogen atom with a mixture of cyclic polyolefinic hydrocarbons having conjugated and non-conjugated unsaturation in the same molecule and recovered from a hydrocarbon complex of a conjunct polymerization catalyst, the condensation being carried out at a temperature of from about −20° to about 200° C. and in the presence of a condensation catalyst which forms substantially no stable complexes with said mixture of cyclic polyolefinic hydrocarbons.

A still further embodiment of this invention relates to a condensation process which comprises reacting a hydroxy benzene containing at least one substitutable nuclear hydrogen atom with a mixture of cyclic polyolefinic hydrocarbons containing conjugated and non-conjugated unsaturation in the same molecule and recovered from a hydrocarbon complex of a conjunct polymerization catalyst, the condensation being carried out at a temperature of from about −20° to about 200° C. and in the presence of a condensation catalyst which forms substantially no stable complexes with said mixture of cyclic polyolefinic hydrocarbons.

An additional embodiment of this invention relates to a condensation process which comprises reacting phenol with a mixture of cyclic polyolefinic hydrocarbons containing conjugated and non-conjugated unsaturation in the same molecule and recovered from a hydrocarbon complex of a conjunct polymerization catalyst, the condensation being carried out at a temperature of from about −20° to about 200° C. in the presence of a condensation catalyst which forms substantially no stable complexes with said mixture of cyclic polyolefinic hydrocarbons.

The aromatic compounds utilizable in this process comprise mono- and polycyclic aromatic hydrocarbons containing at least one substitutable nuclear hydrogen atom, such compounds including benzene, toluene, paracymene, naphthalene, and ethyl naphthalene; hydroxy aromatic compounds such as phenol, resorcinol, and alpha naphthol; halobenzenes such as chloro- and bromo-benzene; and thiophenols. Other aromatic compounds that may be employed in this process include substituted aromatic hydrocarbons such as chlorotoluene, in which the substituents are dissimilar, or benzyl chloride, in which a non-hydrocarbon substituted hydrocarbon substituent is present in the aromatic nucleus.

The cyclic polyolefinic hydrocarbons having conjugated and non-conjugated unsaturation with which the aromatic compounds are condensed in this process consist of the hydrocarbon components of catalyst-hydrocarbon complexes that have been formed by the reaction of hydrocarbons with catalytic agents capable of promoting conjunct polymerization. The catalyst-hydrocarbon complexes or sludges may be obtained by intentionally reacting a suitable hydrocarbon with a sludge-forming, i. e., conjunct polymerization, catalyst, or they may be recovered from certain hydrocarbon conversion processes such as isomerization or alkylation that utilize a conjunct polymerization catalyst.

The hydrocarbons that yield the most desirable sludges comprise certain of the aliphatic and cyclic non-aromatic hydrocarbons. Of this general class, the highly branched-chain paraffins containing at least four carbon atoms per molecule, and the straight- or branched-chain mono- and polyolefins and acetylenes as well as cyclic olefins and cyclic parafins are the preferred materials. The charging stock that is reacted with the conjunct polymerization catalyst to yield a sludge may be a single hydrocarbon or a mixture thereof such as a cracked gasoline or polymer.

The conjunct polymerization catalysts employed in the preparation of the catalyst-hydrocarbon complexes are acid-acting inorganic materials capable of reaction with hydrocarbons to form a sludge phase containing a substantial proportion of the catalyst in the form of a loosely bound catalyst-hydrocarbon complex and a sludge insoluble phase consisting essentially of substantially saturated hydrocarbons. The catalyst complex and the sludge-insoluble hydrocarbons are formed as the result of simultaneous hydrogen transfer and polymerization reactions. Suitable catalysts include aluminum chloride, aluminum bromide, sulfuric acid, and hydrogen fluoride.

In the present process, it has been found that the sludge hydrocarbons prepared from these various catalysts are not completely equivalent, and that they vary also with the hydrocarbon source, even when prepared with the same catalyst. For example, hydrocarbons recovered from aluminum chloride sludges are, in general more unsaturated than those recovered from sulfuric acid sludges, and those present in hydrogen fluoride sludges have more unsaturation, both conjugated and unconjugated, than those present in either aluminum chloride or sulfuric acid sludges, when all three complexes are prepared from the same olefinic hydrocarbon charge (for example, polymer gasoline). On the other hand, a sulfuric acid sludge prepared from the latter charging stock yields hydrocarbons with much more olefinic unsaturation of both the conjugated and unconjugated type than a sulfuric acid sludge formed in the refining of heavy straight-run petroleum fractions, as in the manufacture of lube oils or white oils.

The hydrocarbon component of the sludges may be liberated by subjecting the catalyst hydrocarbon complex to hydrolytic or catalytic decompositions. The hydrolytic decomposition may be accomplished by merely contacting the complex with water and recovering the hydrocarbons that are liberated. These hydrocarbons are cyclic polyolefinic hydrocarbons having conjugated and non-conjugated unsaturation. Alternatively, the complexes may be decomposed by subjecting them to contact with a catalytic agent such as copper at an elevated temperature sufficient to decompose said complexes. One method of doing this is to pass the heated complex into a tower filled with copper turnings at a temperature such that the complex is decomposed and the catalyst passes overhead as a vapor and the hydrocarbon phase collects in the bottom as a liquid. This method is particularly effective when the conjunct polymerization catalyst is hydrogen fluoride. Decomposition methods such as the foregoing should be used; if the catalyst-hydrocarbon complex is decomposed and the constituents separated in a manner (e. g., ordinary distillation) such that free catalyst and hydrocarbon are in contact at elevated temperatures for appreciable periods of time in the absence of a decomposition catalyst, condensation of the hydrocarbon occurs and the hydrocarbon recovered is tarry and low in unsaturation.

Infrared and ultraviolet adsorption studies as well as other analytical data determined on the unsaturated hydrocarbon material obtained from the catalyst-hydrocarbon complexes have shown that the polyenes contained therein are of cyclic structure but are substantially non-aromatic, and have isolated unsaturation in addition to the conjugated unsaturation, and that the four carbon atoms which constitute the conjugated system in said hydrocarbons are highly substituted, possessing, on the average, fewer than two hydrogen atoms per mol as substituents. Diolefin units of this nature may be represented by the general formula:

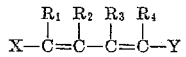

in which X and Y represent other parts of the cyclic polyolefinic molecule and $R_1$, $R_2$, $R_3$, and $R_4$ represent substituents such as hydrogen, an alkyl group, an alkenyl group, a cycloparaffin group, a cycloolefin group, etc.

Representative unsaturated polyolefinic hydrocarbon fractions which have been prepared in this process usually have a wide boiling range of from about 150° to over 450° C., density of about 0.83 to about 0.93, index of refraction of about 1.47 to about 1.53 (but usually 1.48 to 1.50), specific dispersion of about 125 to about 175 (but usually between 135 and 145), bromine numbers above about 140 (although they vary considerably with the average molecular weight), maleic anhydride values of about 30 to about 90 (usually in the range of about 45 to 85), acid number below 3, average number of olefinic double bonds per molecule varying between about 2.5 and about 4, of which from about 40 to about 70 per cent are conjugated, and average molecular weights from about 200 to about 400, although the usual average is in the neighborhood of 300. Unsaturated hydrocarbon fractions derived from hydrogen fluoride sludges have also been prepared in which some of the hydrocarbons have molecular weights of as low as about 150 to as high as about 1000. Although hydrogen to carbon atomic ratios of the hydrocarbons contained in the unsaturated hydrocarbon fraction vary somewhat depending upon the particular source of the material, for a fraction derived from a polymer gasoline-hydrogen fluoride sludge they range from about 1.67 to about 1.72 (for the various fractions) with the actual weight percentages of hydrogen varying from about 12.35 to about 12.6.

The properties of the unsaturated hydrocarbon products will, of course, vary somewhat depending upon whether the entire boiling range of material or a specific fraction is obtained for analysis. In general, the lower boiling fractions have similar properties and are water-white to straw-yellow in color, while the higher boiling fractions are generally somewhat darker and may vary more in properties, with differences in charge stock, conditions of preparation, etc. In some cases, distillate fractions of the product may be more desirable and when these are separated, the distillation may be conducted under vacuum, with steam, or at atmospheric pressure.

Although in some general respects these unsaturated hydrocarbons resemble certain of the terpenes because of the fact that both classes of compounds include cyclic polyolefinic hydrocarbons, in other respects the hydrocarbons used in this process definitely are nonterpenic. For example, terpenes may be represented by the formula $(C_5H_8)_x$ in which it will be noted that the atomic ratio of hydrogen to carbon is 1.60. On the other hand, the sludge hydrocarbons used in this process have been separated into relatively narrow fractions all of which have been found to have hydrogen:carbon atomic ratios of approximately 1.7. Furthermore, a major portion of the sludge hydrocarbons comprises individual hydrocarbons containing a number of carbon atoms that is not a multiple of 5. Still another difference lies in the fact that if the formula of the sludge hydrocarbons (the major portion of which contains conjugated unsaturation) be represented by the formula:

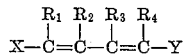

in which X and Y represent other parts of the cyclic polyolefinic molecule and $R_1$, $R_2$, $R_3$, and $R_4$ represent substituents such as hydrogen, an alkyl group, an alkenyl group, a cycloparaffin group, a cycloolefin group, etc., then it has been shown by ultraviolet absorption spectra that not more than two of the R groups are hydrogen atoms. The presence of so many hydrocarbon substituents on the four carbon atoms comprising the conjugated diene system modifies the reactivity of the system so as to make it quite different from that of most terpenes that contain conjugated diene linkages. For example, it is well-known that terpenes may be polymerized in the presence of strong mineral acids to higher molecular weight products which are often resinous in nature. In contrast to this behavior, when the cyclic polyolefins used in this process are treated with strong mineral acids such as sulfuric acid, a coordination compound is formed which upon hydrolysis yields the original cyclic polyolefins in substantially unchanged form.

This invention includes as condensation agents or starting materials not only the unsaturated cyclic hydrocarbons obtained from catalyst-hydrocarbon complexes, but also copolymers of such cyclic unsaturated hydrocarbons and an unsaturated ester of which the most readily available types are the naturally occurring glyceride drying and semi-drying oils such as linseed oil, soy bean oil, sardine oil, and the like. Other unsaturated esters that may be used are dehydrated castor oil and esters of unsaturated fatty acids with polyhydric alcohols other than glycerides such as pentaerythritol or sorbitol. The copolymers are formed by heating the components together at a temperature of about 275 C. for a time sufficient to effect interaction and to increase the viscosity to the desired value.

The catalysts that may be used in the condensation of aromatic compounds containing at least one substitutable nuclear hydrogen atom with cyclic polyolefinic hydrocarbons having conjugated and non-conjugated unsaturation include metal halides of the Friedel-Crafts type such as aluminum chloride, ferric chloride, stannic chloride, zinc chloride, bismuth chloride, aluminum bromide, and the like; Friedel-Crafts metal halides dissolved in a suitable solvent such as stannic chloride dissolved in nitromethane or nitroethane; Friedel-Crafts metal halide-hydrocarbon complexes such as are prepared by reacting aluminum chloride with ethylene, with kerosene, or with other hydrocarbons or hydrocarbon mixtures; solid catalysts comprising an active metal halide deposited on a support such as activated charcoal, alumina, fire brick, etc.; and addition complexes of alcohols, ethers, and ketones with a Friedel-Crafts metal halide such as aluminum chloride monomethanolate. Other catalysts include the acids of pentavalent phosphorus, particularly the ortho and pyro types alone or deposited upon adsorbents or carriers of a siliceous character; alkaline earth acid phosphates such as the dihydrophosphates of calcium, strontium, and barium; cupric orthophosphate or a material formed by calcining hydrated cupric orthophosphate at a temperature within the range of from about 200 to 400° C.; a salt of an acid of phosphorus and a material selected from the members of the right hand column of Group 2 of the Periodic Table; hydrogen fluoride, hydrogen fluoride commingled with boron fluoride, sulfuric acid, mixtures of sulfuric and phosphoric acids, and sulfuric acid dissolved in acetic acid. Still other catalysts include boron fluoride, boron fluoride-ethyl ether complex, mixtures of boron fluoride and water, and alkyl and aromatic sulfonic acids as ethane sulfonic acid, toluene sulfonic acid, etc. Another type of catalyst that may be used in this process is that which comprises metal oxide-containing substances such as synthetically prepared composites of silica and alumina, silica and zirconia, silica, alumina, and zirconia, silica and magnesia, silica, alumina, and magnesia, and the like. These substances may be prepared in any suitable manner including separate, successive, and coprecipitation methods. In many cases naturally occurring clays and activated clays such as acid treated montmorillonite and the like may be employed.

Although all of the catalysts mentioned above may be employed successfully in this process, certain of them are more effective than others in that they form substantially no stable complexes with the cyclic polyolefinic hydrocarbons present in the reaction mixture. With some catalysts, and particularly with aluminum chloride, and if an excess of such a catalyst is used, a substantial portion of the cyclic polyolefinic hydrocarbon is bound in the form of a complex. On the other hand, if an excess of the cyclic hydrocarbon is used, a substantial portion of the aluminum chloride catalyst is bound into the complex. Thus a large part of the catalyst or polycyclic hydrocarbon is in the complex and unavailable for the condensation reaction. As a consequence, best results are obtained in the condensation step when the catalyst employed is: (1) an acid such as phosphoric acid which does not readily form such stable complexes with the cyclic hydrocarbon; (2) a Friedel-Crafts metal halide such as ferric chloride, zinc chloride, or zinc oxychloride which does not readily form stable complexes of this type; (3) a complex of one of the complex-forming catalysts with oxygen-containing materials of which boron fluoride-ethyl ether complex, aluminum chloride-methanol complex, stannic chloride-nitromethane complex, and sulfuric acid-ethyl ether complexes are examples of other catalysts which form substantially no further complexes with the cyclic polyolefinic hydrocarbons.

As shown in the example of this application the catalysts preferred in this process which form substantially no stable complexes with the cyclic polyolefinic hydrocarbon starting material which is condensed with an aromatic compound promote the formation of higher ultimate yields of desired monoalkylated condensation products than that yield obtained in the presence of a complex-forming catalyst such as aluminum chloride.

The process of this invention may be carried out in batch operation by placing a quantity of the catalyst in a reactor equipped with a stirring device, adding the aromatic compound, heating or cooling to a reaction temperature, slowly adding the cyclic polyolefinic hydrocarbon containing conjugated and non-conjugated unsaturation while mixing the contents of the reactor, and recovering the condensation product after a suitable period of time. However, the preferred method is of the continuous type. If the condensation catalyst is liquid, it is continuously charged to a reactor together with the aromatic compound and the cyclic hydrocarbon. The reactor effluent is passed to a settler wherein a separation is effected between the catalyst phase and the product phase. At least a portion of the catalyst phase is continuously recycled to the reaction zone and the product phase is processed for recovery of the desired compounds. If desired, a portion of the catalyst may be continuously regenerated and returned to the system. If the condensation catalyst is a solid, it may be disposed as a fixed bed within a reactor and the reactants continuously passed through the bed at condensation conditions. The condensation product in the effluent is recovered and the unreacted materials may be separated and recycled to the condensation step for further reaction.

The solid catalysts mentioned herein may be used in the finely divided state in a fluidized type of operation. In this method of operation the charge is passed upwardly through a bed of finely divided catalyst causing the catalyst particles to become motionalized and forming a fluid-like mass. The catalyst is intermittently or continuously withdrawn from the reaction zone, regenerated, and returned thereto. Another type of operation employing solid catalyst is the moving bed operation wherein a compact bed of catalyst is continuously passed through the reaction zone concurrently or counter-currently to the incoming reactants and passed therefrom into a regeneration zone from which it is returned to the reaction zone after having been regenerated. Another alternative mode of operation comprises suspending finely divided solid catalyst in the stream of charge stock and treating said suspension under suitable conditions of temperature and pressure to produce the condensation reaction.

The process of this invention may be conducted at temperatures within the range of from about −20° C. to about 200° C. The preferred temperature will depend upon the particular reactants being charged to the process and upon the activity of the particular catalyst being employed, but in general little or no condensation takes place below −20° C. Darkening of the product and polymerization become excessive if the temperature is much above 200° C. The preferred temperature range for most catalysts is from about 0° C. to about 125° C.

It has been found that better results are obtained when the reactants are in the liquid phase; hence the pressure should be such that substantially all of the reactants are in the liquid phase. In general, these pressures will lie within the range of from about 1 to about 100 atmospheres.

When a liquid catalyst is used, the contact time may be in the range of from about three minutes to about six hours. If a solid catalyst is used in a fixed bed, the liquid hourly space velocity, defined as the volume of total feed to the reaction zone divided by the superficial volume of the catalyst in said zone, should be in the range of from about 0.1 to about 10.

The following examples are given to illustrate this invention but they are not introduced with the intention of unduly limiting the generally broad scope of said invention. In each of the examples, approximately 0.275 mol of a fraction (boiling in the range 200–275° C.) of cyclic polyolefinic hydrocarbon containing conjugated and non-conjugated unsaturation, obtained by the hydrolytic decomposition of a hydrogen fluoride-hydrocarbon complex prepared by reacting hydrogen fluoride and polymer gasoline, was weighed into a tarred three-neck flask equipped with an electric stirrer. A molar equivalent of an aromatic compound was weighed into the flask, the apparatus immersed in a Nujol bath, swept out with nitrogen, stirred and heated to approximately 100° C. Approximately 10 weight per cent of the catalytic material was added dropwise. Heating and stirring was continued for five hours. At the end of the contact time the product was thoroughly washed with dilute sodium carbonate solution and distilled water, dried over sodium sulfate and vacuum distilled. The yields are shown in the following table.

| Example No. | Aromatic Compound | Catalyst | Monoalkylated Fraction | | | | | | Percent Monoalkylated phenol, Wt. Percent of Chg. |
|---|---|---|---|---|---|---|---|---|---|
| | | | Boiling Range, °C. | Mol Wt. | Percent C | Percent H | Percent O | Percent Alkylate | |
| 1 | Phenol | H₃PO₄, 85% | 340–400 | 318 | 85.65 | 10.98 | 3.37 | 56.8 | 8.8 |
| 2 | do | BF₃(C₂H₅)₂O | 358–400 | 337 | 84.32 | 10.86 | 4.82 | 81.2 | 14.6 |
| 3 | do | H₃PO₄, 100% | 312–400 | 298 | 86.57 | 11.69 | 1.74 | 29.7 | 4.6 |
| 4 | do | ZnCl₂, anhyd | 340–400 | 381 | 86.42 | 11.80 | 1.96 | 22.5 | 4.7 |
| 5 | do | SnCl₄, anhyd | 332–400 | 335 | 85.68 | 11.22 | 3.10 | 54.1 | 11.2 |
| 6 | do | SnCl₄, CH₃NO₂ | 333–400 | 319 | 86.36 | 11.54 | 2.10 | 37.9 | 7.6 |
| 7 | do | FeCl₃, anhyd | 351–400 | 366 | 85.65 | 11.25 | 3.10 | 54.1 | 9.0 |
| 8 [1] | do | BF₃(C₂H₅)₂O | 350–400 | 360 | 84.27 | 10.96 | 4.77 | 81.2 | 15.6 |
| 9 | do | AlCl₃, anhyd | 348–400 | 378 | 85.86 | 11.12 | 3.02 | 54.1 | 5.3 |
| 10 | Toluene | BF₃(C₂H₅)₂O | 300–375 | 325 | | | | 60.3 | 20.0 |

[1] Check of the experiment given under Example 2.

The portions of the monoalkylated fractions that were not alkylate were polymers of the cyclic polyolefinic hydrocarbons. It will be noted from the results that the best yields were obtained with the less active catalysts.

The alkylated phenols prepared in the examples given above may be used in the preparation of modified phenolic resins by condensing the alkylate with an aldehyde or ketone in the presence of an acidic or a basic catalyst. The aldehyde used may be formaldehyde, or a homologue thereof; or an unsaturated aldehyde such as crotonaldehyde or cinnenaldehyde; or a cyclic aldehyde such as benzaldehyde; or a heterocyclic aldehyde such as furfural. A wide variety of reactive ketones may be similarly employed. The resinous condensation products formed by this method may be either in the form of solid resins or fluid resinoids depending on the degree of condensation. In either case, they possess the ability to condense and polymerize further by the action of heat or pressure in the presence or absence of polymerization catalysts because of their residual unsaturation. For the same reason, they are capable of vulcanization in the presence of sulfur under the influence of heat, pressure, and suitable accelerators. Because of this unusual combination of properties, the resins are capable of wide usage as molding materials, coatings, rubber additives, adhesives, and impregnants for cloth, wood, and paper.

The process of this invention is also suitable for producing a novel composition useful as an intermediate for manufacture of coating resins and molding resins by condensing an aromatic compound containing at least one nuclear hydrogen atom with a copolymer of an unsaturated ester and a cyclic polyolefinic hydrocarbon containing conjugated and non-conjugated unsaturation. The unsaturated esters include particularly the naturally occurring glyceride drying oils, semi-drying oils and esters of unsaturated fatty acids with polyhydric alcohols referred to hereinabove.

I claim as my invention:

1. A process which comprises condensing an aromatic compound containing at least one substitutable nuclear hydrogen atom with a mixture of cyclic polyolefinic hydrocarbons having conjugated and non-conjugated unsaturation in the same molecule and recovered from a hydrocarbon complex of a conjunct polymerization catalyst, the condensation being carried out in the presence of a condensation catalyst selected from the group consisting of boron fluoride-ethyl ether complex, aluminum chloride-methanol complex, stannic chloride-nitromethane complex and sulfuric acid-ethyl ether complex.

2. The process defined in claim 1 further characterized in that the condensation catalyst is a stannic chloride-nitromethane complex.

3. The process defined in claim 1 further characterized in that the condensation catalyst is an aluminum chloride-methanol complex.

4. The process defined in claim 1 further characterized in that the condensation catalyst is a sulfuric acid-ether complex.

5. The process defined in claim 1 further characterized in that the catalyst is a boron trifluoride-ether complex.

6. The process of claim 1 further characterized in that said aromatic compound is a hydrocarbon.

7. The process of claim 1 further characterized in that said aromatic compound is a hydroxy benzene.

8. The process of claim 1 further characterized in that said aromatic compound is a phenol.

9. The process of claim 1 further characterized in that said condensation is effected at a temperature of from about $-20°$ to about $200°$ C.

10. A condensation process which comprises reacting phenol with a mixture of cyclic polyolefinic hydrocarbons containing conjugated and non-conjugated unsaturation in the same molecule and recovered from a hydrocarbon complex of a conjunct polymerization catalyst, the condensation being carried out at a temperature of from about $-20°$ to about $200°$ C. in the presence of an aluminum chloride-methanol catalyst.

11. A condensation process which comprises reacting phenol with a mixture of cyclic polyolefinic hydrocarbons containing conjugated and non-conjugated unsaturation in the same molecule and recovered from a hydrocarbon complex of a conjunct polymerization catalyst, the condensation being carried out at a temperature of from about $-20°$ to about $200°$ C. in the presence of a boron trifluoride-ether catalyst.

12. A condensation process which comprises reacting phenol with a mixture of cyclic polyolefinic hydrocarbons containing conjugated and non-conjugated unsaturation in the same molecule and recovered from a hydrocarbon complex of a conjunct polymerization catalyst, the condensation being carried out at a temperature of from about $-20°$ to about $200°$ C. in the presence of a catalyst comprising boron trifluoride.

13. A condensation process which comprises reacting phenol with a mixture of cyclic polyolefinic hydrocarbons containing conjugated and non-conjugated unsaturation in the same molecule and recovered from a hydrocarbon complex of a conjunct polymerization catalyst, the condensation being carried out at a temperature of from about $-20°$ to about $200°$ C. in the presence of a stannic chloride-nitromethane catalyst.

14. A condensation process which comprises reacting phenol with a mixture of cyclic polyolefinic hydrocarbons containing conjugated and non-conjugated unsaturation in the same molecule and recovered from a hydrocarbon complex of a conjunct polymerization catalyst, the condensation being carried out at a temperature of from about $-20°$ to about $200°$ C. in the presence of a sulfuric acid-ethyl ether catalyst.

References Cited in the file of this patent

UNITED STATES PATENTS

| Number | Name | Date |
|---|---|---|
| 2,162,172 | Honel et al. | June 13, 1939 |
| 2,290,211 | Schaad | July 21, 1942 |
| 2,400,521 | Kuhn, Jr. | May 21, 1946 |
| 2,470,894 | Johnstone | May 24, 1949 |
| 2,530,772 | Johnson et al. | Nov. 21, 1950 |
| 2,596,235 | Geiger | May 13, 1952 |